UNITED STATES PATENT OFFICE 2,499,648

DINITROHEXACHLOROBUTANES

George John Janz, London, England, assignor to Canadian Industries Limited, Montreal, Quebec, Canada, a corporation of Canada No Drawing. Application September 27, 1947, Serial No. 776,615. In Canada April 26, 1947

2 Claims. (Cl. 260—644)

This invention relates to new compositions of matter, dinitrohexachlorobutanes, and to a method for their preparation from the dimers of trichloroethylene.

In United States Patent No. 2,161,078 there is described a process for the preparation of the dimers of trichloroethylene which comprises heating trichloroethylene above atmospheric pressure at 150–227° C. in the absence of a catalyst. The dimers may also be prepared by refluxing trichloroethylene with an inorganic or an organic peroxide, such as benzoyl peroxide, as disclosed in A. P. C. 221,264. The compounds have the formula $C_4H_2Cl_6$ and are hexachlorobutenes.

It is an object of this invention to provide new addition products of the dimers of trichloroethylene. Another object is the provision of dinitrohexachlorobutanes. A further object is the preparation of dinitrohexachlorobutanes by the addition of nitrogen tetroxide to the dimers of trichloroethylene. Other objects will appear hereinafter.

These objects are accomplished by reacting nitrogen tetroxide with the dimers of trichloroethylene in a closed system, at a temperature of about 80° C. and for a period of three to six hours. The following examples in which the quantities are given by weight are illustrative of the more detailed practice of this invention.

Example I 1 g. of the dimers of trichloroethylene and about a twofold excess of purified nitrogen tetroxide were sealed in a glass bomb tube while chilled at Dry-Ice acetone temperatures. The glass bomb was then heated for three hours at 80° C. after which time it was chilled once more and opened. The contents were transferred into an opened breaker thus allowing the excess of nitrogen tetroxide to boil off from the reaction mixture. A crystalline product separated from the viscous liquid in the beaker on standing. This product, once separated by filtration and air dried, weighed 0.8 g., i. e., a 59% yield based on the weight of hexachlorobutenes used.

Example II 1 g. of the dimers of trichloroethylene were treated with nitrogen tetroxide as in Example I but the mixture was heated for a total period of 5½ hours at 80° C. A 59% yield of crude dinitrohexachlorobutanes was thus obtained. The crude product, having a melting point of 45–47° C., was afterwards purified by recrystallization from low-boiling petroleum ether. The melting point was then found to be 60–62° C. and the analysis: Chlorine calculated 59.98%, found 59.76–60.21%; Nitrogen calculated 7.89%, found 7.46–7.48%. The X-ray powder diffraction pattern was characterized by the following three intense lines: 3.33kX, 4.75kX and 3.13kX.

Example III

After 1.2 g. hexachlorobutenes had been reacted with nitrogen tetroxide for 18–20 hours at 80° C. in the same manner as in Example I, a 52% yield of crude dinitrohexachlorobutanes was obtained.

The temperature of the reaction may vary from about 50° C. to above 100° C. but the optimum temperature is about 80° C.

The optimum range for the reaction time is from three to six hours, and longer reaction periods do not favour increased yields of dinitrohexachlorobutanes, as illustrated in Example III.

The dinitrohexachlorobutanes possess good fungicidal properties and they are particularly suitable for soil fumigating purposes.

As many apparently widely different embodiments of this invention may be made without departing from the spirit and scope thereof, it is to be understood that I do not limit myself to the specific embodiments thereof except as defined in the appended claims.

Having thus described my invention, what I claim is:

1. A process for preparing dinitrohexachlorobutanes which comprises reacting the dimers of trichloroethylene with nitrogen tetroxide in a closed system at a temperature of about 80° C. for a period of three to six hours, cooling the reaction mixture, separating the dinitrohexachlorobutanes from said mixture and purifying them by recrystallization from low boiling petroleum ethers.

2. As new compounds, dinitrohexachlorobutanes.

GEORGE JOHN JANZ.

REFERENCES CITED

The following references are of record in the file of this patent:

UNITED STATES PATENTS

| Number | Name | Date |
|---|---|---|
| 1,707,727 | Kampa et al. | Apr. 2, 1929 |
| 2,161,078 | Mugdan | June 6, 1939 |
| 2,447,504 | Haas et al. | Aug. 24, 1948 |

FOREIGN PATENTS

| Number | Country | Date |
|---|---|---|
| 410,470 | Germany | Mar. 10, 1925 |

OTHER REFERENCES

Steinkopf et al., Ber. deut. Chem., vol. 75 (1942) pages 1323–1330.

Haas et al., "Chem Reviews," vol. 32, pages 375-6 (June 1943).